Sept. 28, 1954   J. A. BRADLEY   2,690,555
PROTECTION SYSTEM FOR MOBILE BODIES
Filed Oct. 10, 1947   4 Sheets-Sheet 1
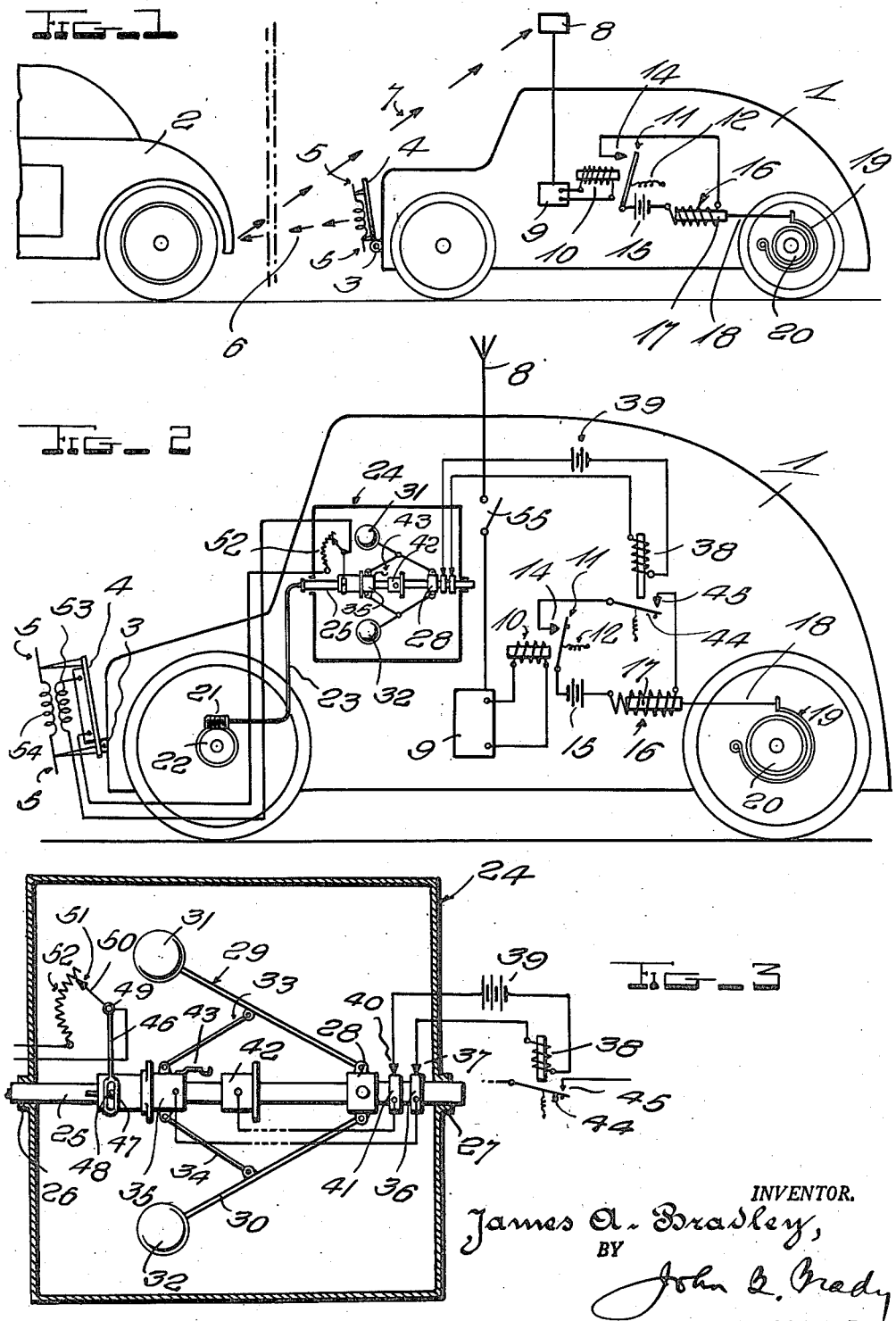
INVENTOR.
James A. Bradley,
BY
John B. Brady
ATTORNEY Sept. 28, 1954
J. A. BRADLEY
2,690,555
PROTECTION SYSTEM FOR MOBILE BODIES
Filed Oct. 10, 1947
4 Sheets-Sheet 2
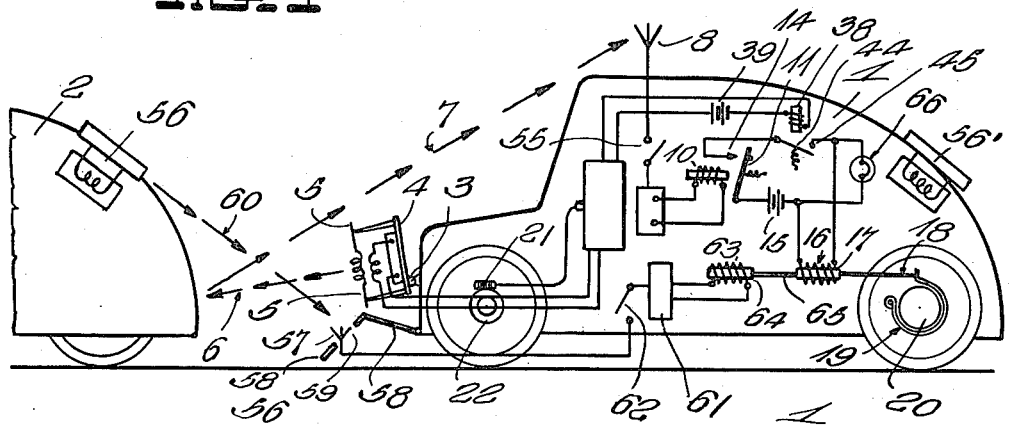
Fig. 4
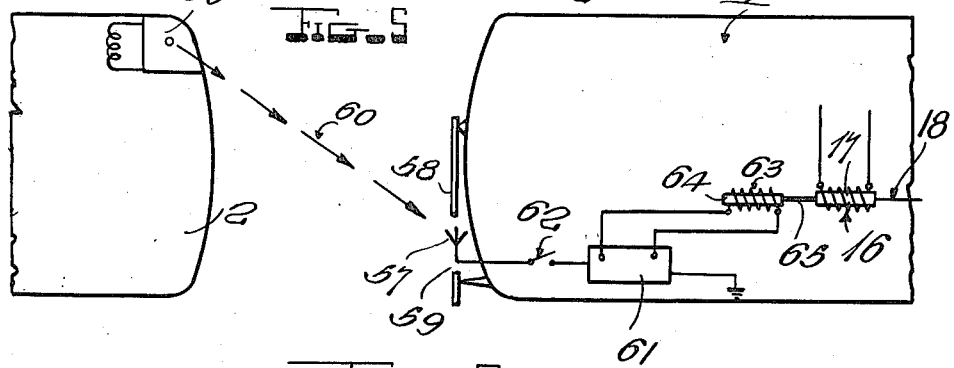
Fig. 5
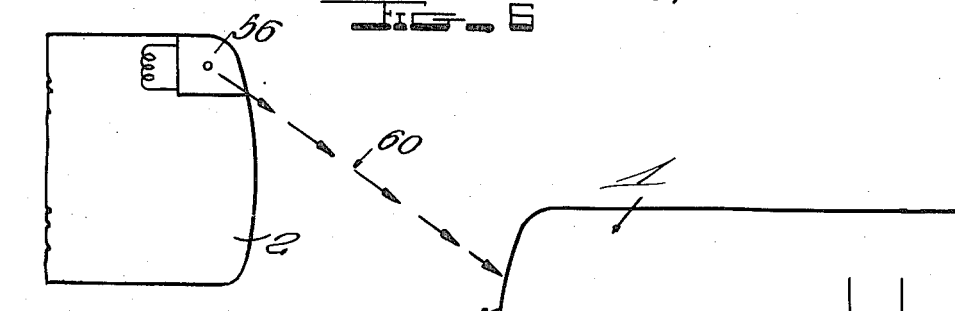
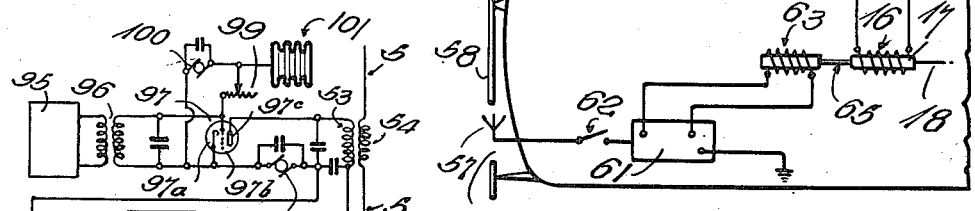
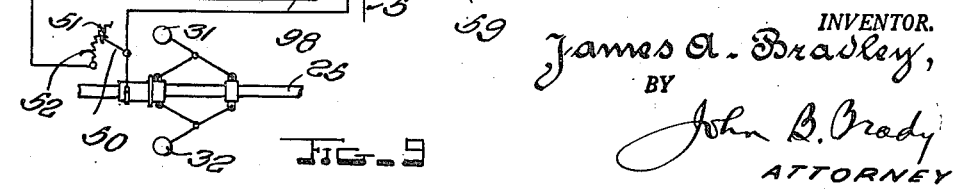
Fig. 9
INVENTOR.
James A. Bradley,
BY
John B. Brady
ATTORNEY Sept. 28, 1954  J. A. BRADLEY  2,690,555
PROTECTION SYSTEM FOR MOBILE BODIES
Filed Oct. 10, 1947  4 Sheets-Sheet 3
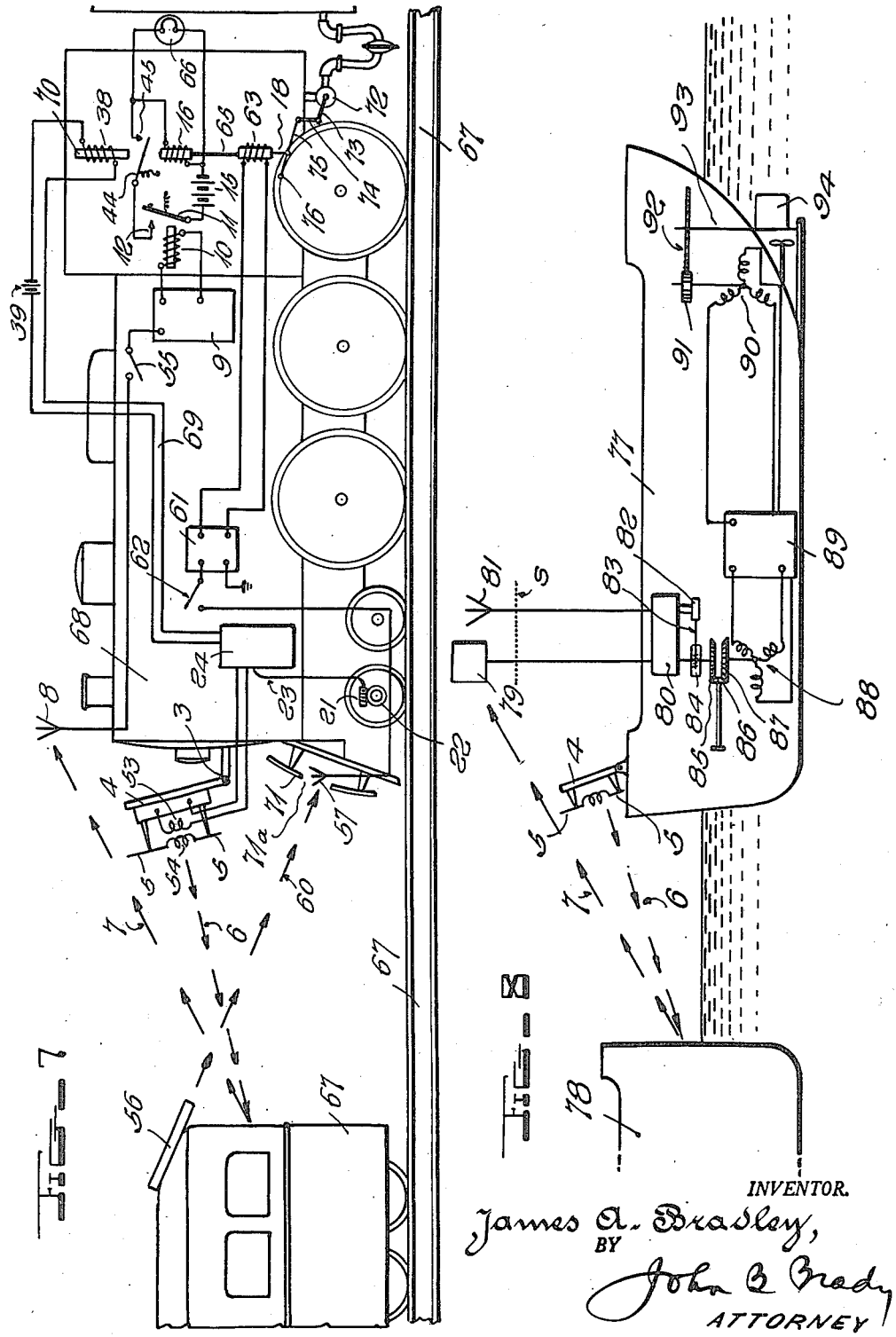
INVENTOR.
James A. Bradley,
BY
John B. Brady
ATTORNEY Sept. 28, 1954 J. A. BRADLEY 2,690,555
PROTECTION SYSTEM FOR MOBILE BODIES
Filed Oct. 10, 1947 4 Sheets-Sheet 4
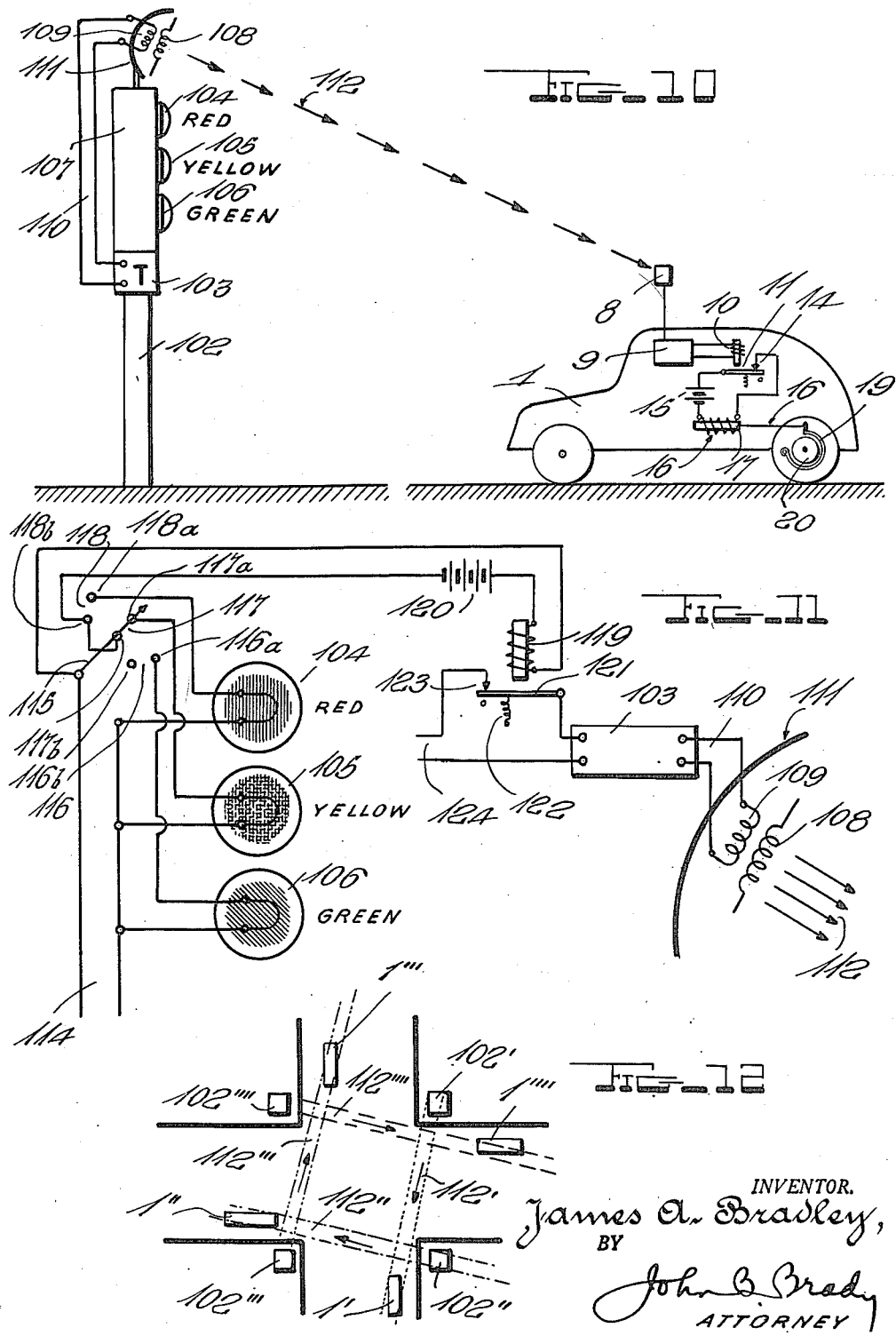
INVENTOR.
James A. Bradley,
BY
John B. Brady
ATTORNEY Patented Sept. 28, 1954

2,690,555

UNITED STATES PATENT OFFICE 2,690,555

PROTECTION SYSTEM FOR MOBILE BODIES

James Albert Bradley, St. Petersburg, Fla.; L. W. Baynard, executor of said James Albert Bradley, deceased, assignor to James Lewis Bradley and Kent Palmer Bradley, both of St. Petersburg, Fla., share and share alike, with right of survivorship Application October 10, 1947, Serial No. 779,012

10 Claims. (Cl. 343—7)

My invention relates broadly to radio control systems and more particularly to a system of radio protection for mobile bodies, such as automobiles, trains, and other moving bodies, for automatically preventing collision and accidents.

This application is a continuation-in-part of my application Serial No. 490,648, filed June 12, 1943, for Remote Detection and Control System, now Patent No. 2,513,279.

One of the objects of my invention is to provide a system of protection for mobile bodies for the prevention of collision of automobiles, trains, or other moving bodies, utilizing a system of radio transmission.

A still further object of my invention is to provide a protective system for vehicles in which radio propagation of energy from a vehicle to obstructions is controlled in accordance with the speed of movement of the vehicle.

Still another object of my invention is to provide a protective arrangement for mobile bodies in which the amplitude of a propagated beam of energy from a mobile body is controlled in accordance with the speed of the mobile body, whereby the propagation is increased for mobile bodies moving at high speed and reduced on mobile bodies moving at lower speeds.

A still further object of my invention is to provide a control circuit arrangement for radio transmission systems on vehicles for effecting control of brakes of the mobile body, including speed responsive means for cutting down the propagation of the projected radio beam from a moving vehicle at low speed and increasing the projected propagation of the radio beam at high speed of the mobile body.

Still another object of my invention is to provide a directional system for propagating radio frequency energy from a preceding mobile or stationary body to an approaching mobile body for activating the brake control circuit of the approaching mobile body and preventing collision thereof with the preceding mobile or stationary body.

Still another object of my invention is to provide an arrangement for shielding the pick-up antenna on the approaching mobile body with respect to a propagating radio transmitter on a preceding mobile or anterior stationary body so that activation of the brake control system on the approaching mobile body is controlled within predetermined limits permitting the passage of the approaching mobile body with respect to the preceding mobile or stationary body without danger of collision.

Still another object of my invention is to provide a control circuit for radio transmission systems on mobile bodies in which the range of radio transmission is regulated in accordance with barometric weather conditions and speed of the mobile body, whereby collision protection may be assured over a wide range of variable weather and speed conditions.

A still further object of my invention is to provide a method of radio brake control system for vehicles coordinated with the traffic control circuit of a traffic signal system.

Other and further objects of my invention reside in the protective circuit arrangements for mobile bodies, as set forth more fully in the specification hereinafter following, by reference to the accompanying drawings, in which:

Figure 1 is a diagrammatic view showing the system of my invention applied to the protection of mobile bodies such as automobiles, trains, and other moving bodies, for automatically preventing collision and accidents; Fig. 2 diagrammatically shows the arrangement of protective circuits on a vehicle in which the amplitude of the propagated radio beam of energy transmitted from the vehicle is controlled according to the speed of the vehicle; Fig. 3 is an enlarged schematic view showing the arrangement of speed controlled regulator on the vehicle for controlling the propagation of the radio beam of energy from the moving vehicle; Fig. 4 is a schematic view illustrating the coaction of a preceding or stationary and approaching mobile body equipped with the protective system of my invention; Fig. 5 is a plan view showing the relative positions of a preceding and an approaching mobile body protected with the system of my invention and showing the manner in which the approaching mobile body has the brake control circuit thereof activated from energy received from the preceding mobile or stationary body when in obstructing position; Fig. 6 is a view similar to Fig. 5, but illustrating the approaching mobile body moving out of the obstructing path of the preceding mobile body with the accompanying decontrol of the brake system thereof from the effects of the transmitter carried by the preceding mobile or stationary body; Fig. 7 illustrates the application of my invention to collision prevention system for trains; Fig. 8 schematically shows the application of the system of my invention to the collision prevention to vessels at sea; Fig. 9 shows the circuit arrangement for the transmitter on the approaching mobile body which is regulated both in accordance with barometric weather conditions and speed of the mobile body; Fig. 10 illustrates the application of the brake control system to traffic towers in which the radio transmission to vehicles is coordinated with changes is display of the traffic lights; Fig. 11 diagrammatically shows the circuit arrangement of the traffic light system of Fig. 10 and the manner of activating the brake control transmitter during the atcivation of the stop and caution signal lights; and, Fig. 12 illustrates the manner of installing the protective system of my invention at a traffic intersection.

Referring to the drawings in detail, reference character 1 designates the vehicle which is equipped with collision preventing means in accordance with the system of my invention. The objective or vehicle with which collision is to be avoided is represented by reference character 2. The transmitter carried by vehicle 1 is represented as mounted on a support 3 carried by the forward portion of vehicle 1 and including a reflector 4 for directing high frequency energy radiated from doublet 5 in the path represented by 6. The path of the ray 6 is intercepted by the preceding obstructive vehicle 2 and is reflected along the path represented at 7. A receiving antenna 8 mounted on the approaching vehicle 1 receives the energy reflected from the preceding vehicle 2 and energizes the receiving system 9 on vehicle 1. The output of receiving system 9 includes the relay winding 10 which operates the armature 11. Armature 11 is normally maintained in an open circuit condition under control of spring 12, but when energized by relay winding 10 moves to a position closing contact 14 and completing the electrical circuit from source 15 through the electromagnetic brake control solenoid 16. The brake control solenoid 16 controls the movement of armature 17 and brake control member 18 for operating the brake band system 19 for gripping the brake drum 20 and slowing the vehicle 1 for automatically preventing collision with preceding obstruction 2. The receiving apparatus 9 is precalibrated to activate relay winding 10 upon increase in signal level above a predetermined level. Accordingly, the brakes are activated when the approaching vehicle 2 reaches a dangerously close position with respect to preceding obstruction 2.

In Fig. 2 I have schematically illustrated the method of controlling the propagation of radio frequency energy from the approaching vehicle 1 in accordance with the speed of the vehicle. In this arrangement a geared connection 21 is made with a coacting gear driven by one of the vehicle axles represented at 22 and rotating movement transmitted through shaft 23 in accordance with the speed of the vehicle. A centrifugally operated control mechanism is mounted on the vehicle in housing 24 shown on an enlarged scale of Fig. 3.

In Fig. 3 the shaft 25 is shown journaled in housing 24 at 26 and 27, and carrying a hub member 28 thereon to which are pivoted arms 29 and 30, carrying centrally located weights 31 and 32. Arms 29 and 30 have connecting arms 33 and 34 extending therefrom and connected with the slidable sleeve member 35. The slidable sleeve 35 is insulated from shaft 25 by a suitable hub of insulation material and is connected with collector ring 36 also insulated from shaft 25. Collector ring 36 establishes connection with brush 37 which connects with the relay control winding 38. The circuit through relay control winding 38 includes the source of potential 39 and terminates at brush 40 forming sliding connection with collector ring 41 carried by, but insulated from, shaft 25. Collector ring 41 connects to sleeve-like contact 42 which is set in a predetermined position on shaft 25. Under centrifugal action arms 29 and 30 are spread, moving sleeve 35 toward contact sleeve 42. Sleeve 35 carries the spring arm 43 thereon which engages and makes electrical contact with contact sleeve 42 when the centrifugal weights 31 and 32 are displaced to a predetermined position due to increasing speed of the vehicle. As soon as arm 43 completes electrical connection with contact sleeve 42 the electrical circuit is closed through collector rings 36 and 41 and brushes 37 and 40 and potential 39 with control relay winding 38 which thereby conditions the radar brake control circuit by moving armature 44 to a position closing contact 45 in series with the brake actuating solenoid 16, potential source 15 and coacting relay armature 11 and contact 14. Thus, at a predetermined speed the radar brake system becomes activated whereas at lower speeds the radar brake system is inactivated.

I associate the displaceable sleeve 35 with an arm member 46 which is slotted at 47 to embrace a pin 48 carried by sleeve 35, in such manner that arm 46 is displaced as pin 48 is moved by sleeve 35. Arm 46 is pivoted at 49 and has an extension 50 thereon carrying a contact 51 which operates over a resistor 52. The resistor 52 is variably included in the primary circuit 53 of the radio transmitter which has the antenna system thereof mounted at 3 adjacent the forward portion of the vehicle 1. The primary circuit of the radio transmitter, represented at 53 is coupled to the secondary system 54 which connects with the doublet 5 of the transmitter explained in connection with Fig. 1. Reflector 4 when angularly shifted to a predetermined position directs the propagation of the radio frequency wave in a desired direction for striking any obstruction in the path of the approaching vehicle 1. By reason of the insulation of resistance 52 in the primary circuit of the radio transmitter the propagation of the beam of energy forward from the approaching vehicle 1 is maintained over a relatively short distance at low speeds of the vehicle 1, as radar protection at low speeds is not of vital importance. However, as the speed of the vehicle increases arms 29 and 30 are spread, sleeve member 35 is displaced and arm 46 is angularly shifted for proportionally moving arm 50 and contact 51 to a position in which the effective resistance 52 in the primary circuit of the transmitter is reduced, thereby considerably increasing the amplitude of the radiated wave from the transmitting doublet 5 and increasing the distance of radar protection which is afforded to the vehicle 1. The receiver 9 connects to receiving antenna 8 through a switch 55 which may be opened when it is not desired to operate the vehicle with radar brake protection.

In Figs. 4, 5 and 6 I have shown a radar protective system for vehicles in which the activating energy for the brake system on the approaching vehicle 1 is received from a high frequency transmitter 56 carried by the preceding vehicle 2 or stationary object. In the arrangement of Figs. 4-6 the approaching vehicle 1 carries all of the equipment previously explained in connection with Fig. 2, and in addition is equipped with the ultra high frequency receiving antenna 57. The ultra high frequency receiving antenna 57 is shielded by means of a shield represented at 58 in such manner that the receiving antenna 57 is not effected by the radiation from transmitting doublet 5 of the transmitter on the forward end of vehicle 1. The shield 58 is apertured at 59 to permit the ultra high frequency beam of energy 60 to be received from ultra high frequency transmitter 56 on vehicle 2, when approaching vehicle 1 is in a dangerous position tending to collide with preceding vehicle 2, as represented in Fig. 5. When approaching vehicle 1 moves out of the range of beam 60 emitted by transmitter 56 on the preceding vehicle 2 as shown in Fig. 6, the antenna 57 does not receive energy from the preceding vehicle and the brake circuit of vehicle 1 is not activated.

The directivity of transmitter 56 on preceding vehicle 2 or stationary objects is very accurate and substantially pin point alignment of the beam 60 must be made with aperture 59 which constitutes the dangerous approach condition between approaching vehicle 1 and preceding vehicle or obstacle 2 before the brake system on approaching vehicle 1 is activated. The equipment on approaching vehicle 1, which is additional to the equipment heretofore explained in connection with Fig. 2, comprises the ultra high frequency receiver 61 which is connected through a switch 62 with the antenna 57. The circuit of receiver 61 connects to the relay winding 63 which operates solenoid 64 connected through link 65 with core 17 of solenoid 16 which connects as heretofore explained through brake actuating rod 18 to the brake band system 19 for operation in conjunction with brake drum 20.

In order to indicate to the operator when the reflected energy is received from the preceding vehicle I provide a visual indicating signal 66 connected in parallel with solenoid 16. Thus the operator of the vehicle is informed by the visual signal 66 when the brake system is activated by the presence of the obstruction constituted by the preceding vehicle 2 or stationary object.

The protection afforded by the ultra high frequency system 56—57 insures against head-on collision in the event of failure of the radar system 5—8 and yet permits the approaching vehicle 1 to pass the preceding object 2.

The operation of the transmitter 56 on the preceding vehicle 2 and the receiving antenna 57 on the approaching vehicle 1 are very important. All vehicles making use of the protective system are uniformly equipped; for example, approaching vehicle 1 contains a rear transmitter of ultra-high frequency designated at 56' similar to the transmitter 56 in the preceding vehicle 2. It is because of the angular relationship of the transmitter on the preceding vehicle or object and the antenna on the approaching vehicle that a high degree of accuracy is obtained in the radar control of the brake system of my invention.

In Fig. 7 I have shown the application of the system of my invention for collision prevention systems for railway trains. The track system is illustrated at 67 over which the locomotive 68 operates, approaching the rear of preceding train 67. The equipment carried by the locomotive 68 is similar to the equipment carried by the automobile illustrated in Figs. 4, 5 and 6, in that the transmitter is carried by bracket support 3 on which reflector 4 is mounted. The doublet 5 is insulatingly supported with respect to the transmitter and the reflector 4 and is operative to transmit high frequency energy along the path 6. The preceding railway train or stationary object 67 forms an obstruction which constitutes a reflecting surface for the high frequency energy along path 6 which is returned along path 7 and picked up by receiving antenna 8 carried by the locomotive 68. The transmitter includes the coupled primary circuit 53 and secondary circuit 54. The primary circuit 53 is controlled by a centrifugally operated variable resistance device housed within casing 24 and controlled through flexible shaft 23 from the gear system 21 driven from the gear system 22 co-ordinated with the wheels 22 of the locomotive 68.

The conditioning circuit which places the radar system into operation for speeds of locomotives above a predetermined slow speed is represented at 69 leading to the relay winding 38 for controlling solenoid 70 which controls armature 44 drawing armature 44 up into connection with contact 45 for closing the circuit at contact 45 to the brake actuating solenoid 16. As in the case of the vehicle control system the receiving antenna 8 connects through manually controlled switch 55 with receiver 9 the output of which contains relay 10 for moving armature 11 to a position closing contact 12 in the circuit which includes potential source 15 and brake operating solenoid 16. The locomotive engineer is also provided with a signal indicator as shown at 66, similar to that explained in connection with the automobile installation of Figs. 4–6. The installation on the locomotive also includes the ultra high frequency receiving antenna 57 located with relation to the shield 71 on the front of the locomotive to enable the ultra high frequency beam energy 60 which is propagated from the ultra high frequency transmitter 56 on the rear of train 67 to be received through restrictive aperture 71a without interference from the propagated energy emitted by doublet 5. That is to say, the direct effects of the transmitter carried by the locomotive 68 are prevented from influencing the adjacent receiving antennas 57 or 8 by the proper location of these receiving antennas and the shielding thereof.

In the case of the locomotive installation the brake system is controlled by a suitable valve designated at 72 in which lever arm 73 is connected to link 74 with lever arm 75 pivoted at 76 and connected through link 18 to solenoid 63 and through link 65 to solenoid 16. Solenoid 63 is activated from the output circuit of the receiver 61 connected with the ultra high frequency antenna 57. As the locomotive 68 approaches an obstruction formed by preceding train or stationary object 67 the energy transmitted from path 6 is reflected along path 7 to activate receiving antenna 8 for controlling receiver 9 and closing the local circuit which energizes the solenoid 16. If the locomotive is operating at a sufficiently high speed to effect a closing of the circuit through lead 69 then armature 44 will have moved to contacting position with contact 45, thereby assuring completion of the circuit upon receipt of a reflective radar impulse incidental upon receiving antenna 8, thereby effecting operation of the valve 72. In the event of failure of any portion of the radar system as herein described, the energy received from ultra high frequency transmitter 56 from the preceding train 57 will activate receiving antenna 57 and excite receiver 61 thereby energizing solenoid winding 63 and moving the air brake actuating lever 75 for operating the air brake valve 72. Thus protective assurance that locomotive 68 will be arrested in movement and prevented from colliding with the rear of train 67 is provided.

In Fig. 8 I have shown a vessel 77 equipped with radar control mechanism for automatically averting collision with another vessel 78. The apparatus employed is similar to the apparatus described in connection with the automobile and locomotive protective control. Energy from vessel 77 is propagated from the antenna radiating system shown at 5 and directed by means of reflector 4 along the path 6 whereby it strikes the obstructing vessel 78 and is returned along the path 7 for activating the loop receiving antenna 79 associated with the receiver 80 and antenna 81. The loop antenna 79 is automatically orientatable by driving motor 82 through worm and gear combination 83—84 for driving through the corrective gear systems 85, 86 and 87, the "Selsyn" generator 88. Energy is imparted by "Selsyn" generator 88 through synchronous follow-up system 89 to the "Selsyn" motor 90 which drives gear system 91. It will be understood that the arrangement of mechanism described is schematic and that an adequate system of gears will be provided for accomplishing the purposes schematically illustrated in Fig. 8. The gear system 91 meshes with gear system 92 for operating rudder control shaft 93 for correspondingly operating rudder 94. The rudder shaft 93 is so controlled that rudder 94 will be angularly shifted to enable vessel 77 to be guided in such direction as will escape collision with obstruction 78. The circuits of the receiving system are regulated to respond at an amplitude precalibrated at a distance between the vessel 77 and obstruction 78. Direct influence of the transmitter 5 upon the receiving transmitter system 78—91 is prevented by a suitable shield schematically illustrated at S.

The system of my invention has been developed for operation under all conditions of weather and at predetermined speeds of the mobile bodies equipped with the apparatus of my invention. In Fig. 9 I have schematically illustrated one method which I employ for controlling the operation of the transmitter from the mobile body according to variable barometric weather conditions. The transmitter is schematically shown at 95 connected to coupling circuit 96 with radio frequency amplification system, represented at 97. The radio frequency amplification system 97 is represented by an electron tube including cathode 97a, control grid 97b and anode 97c, the output circuit from anode 97c to cathode 97a includes the primary circuit 53 which couples to the secondary circuit 54 of the doublet represented at 5. The output circuit is completed through high potential source 98. The control grid 97b is variably biased through rheostat or resistance 99 in circuit with source of potential 100 under control of the operation of the aneroid cell 101. The aneroid cell varies in physical characteristic according to barometric pressure for correspondingly changing the setting of rheostat or resistance 99. As barometric conditions change the biased potential on the control grid 97b is changed. By increasing the bias potential more negative the degree of amplification is reduced, thereby restricting in good weather the propagation of energy into space from doublet 5. Upon reducing the negative biased in heavy or bad weather the degree of amplification is increased within limits determined by the characteristics of the two, thereby increasing propagation in bad weather operation. Associated with the barometric pressure arrangement, I include the speed control system whereby the centrifugally operated weights 31 and 32 operate the switch arm 50 for moving contact 51 over resistance 52 for changing the effective resistance in circuit with the primary winding 53. At low speeds a large amount of resistance is included in the transmitter circuit, thereby reducing propagation from doublet 5, whereas in high speeds resistance 52 is substantially cut out of the transmitter circuit thereby increasing amplitude of wave propagation from doublet 5. Accordingly, two variables operate to control the emission from doublet 5, that is, barometric pressure and speed. Barometric pressure controls the grid bias potential, whereas speed controls the effective resistance of the transmitter circuit and either or both of which control the amplitude of propagation from doublet 5.

In Figs. 10–12 I have shown the principles of my invention applied to traffic control systems wherein the brake control circuit is activated in correlation to the traffic signal control circuit. The brake control circuit on vehicle 1 is the same as that described in connection with Figs. 1 and 2. The high frequency energy for controlling the brake system is transmitted from the traffic light tower 102. Tower 102 serves to support the high frequency radio transmitter 103 and the conventional traffic signal lights designating the "Stop" or red signal lights 104; the "Caution" or yellow signal lights 105; and the "Go" or green signal lights 106. The signal lights are mounted in the conventional casing 107 on the top of which I arrange a high frequency energy emitter 108 coupled to a high frequency transmission circuit 109 connected through leads 110 with high frequency signal transmitter 103. The emitter 108 has a reflector 111 associated therewith for directing a beam of energy along path 112 in the path of oncoming traffic.

As the vehicles approach a position in the field of the beam along path 112 antenna 8 on the vehicle receives the high frequency for controlling the braking circuit.

Fig. 11 shows the manner of correlating the traffic signal circuit with the emission of radio frequency antenna 108. The power supply circuit to the traffic signal circuit is represented at 114 connected at one side to each of the signal lights 104, 105 and 106. The lights are selectively and periodically connected to the power supply circuit 114 through the positively driven rotatable switch arm 115 operative over sets of double contacts 116, 117 and 118. The sets of double contacts 116 and 117 are constituted by radially aligned contact elements 116a and 116b; 117a and 117b; and 118a and 118b, arranged in the path of the rotating arm 115. As arm 115 moves in a counter-clockwise direction the "Go" signal 106 is activated through contact element 116a; then the "Caution" signal is activated by connection of contact element 117a. At the same time a circuit is completed through contact element 117b to control solenoid 119 in series with power source 120 for moving armature 121 against the action of spring 122 and closing contact 123 completing the circuit from power supply circuit 124 to the high frequency radio transmitter 103. This operation actuates the radio transmitter causing radiation of energy along beam 112. The energy is received on the vehicle and serves to set the brakes by operation of the braking circuit as explained in connection with Figs. 1 and 10. Similarly when arm 115 moves to the set of contacts 118 the red light 104 connected to contact element 118a is activated and simultaneously the radio transmitter 103 is energized through contact element 118b which is parallelly connected with contact 117b. Thus the braking circuit on vehicle 1 is set in braking position and vehicle 1 is brought to a stop either under conditions of "Caution" or "Stop." Under conditions of "Go" the radio transmitter 103 is deactivated and the brake circuit on the vehicle is released.

The manner of arranging the braking control system at a traffic intersection is shown in Fig. 12, wherein the traffic towers are indicated at 102', 102", 102''' and 102''''. These towers each have an antenna thereon for directively propagating beams of energy along substantially confined channel paths designated at 112', 112", 112''' and 112''''. These channel paths of energy are intercepted by vehicles moving in the raffic lane approaching the intersection as represented, respectively, by the position of vehicles 1', 1", 1''' and 1''''. As the vehicles approach the intersection within the limit of the range of the beam of energy in that lane a change of the traffic lights controlling the flow of traffic in that lane has the effect under conditions of "Caution" or "Stop" of applying the brakes of the vehicle and preventing the vehicle from running past the intersection. The effective distance of propagation of the beams is restricted to that area or position in which a vehicle is normally brought to waiting position in a line of vehicles at the conventional traffic tower system. While I have shown a four tower traffic control system the same principles may be applied to a single central tower or hanging traffic light control system. Interference and extraneous dissipation of the beams is eliminated by the highly directional properties imparted to the respective beams.

In lieu of the mounting of the radiating means on the traffic tower I may embed the radiating means in the roadbed and confine the radiation to an extremely short distance in the direction of the oncoming traffic for slowing the vehicles before they reach a dangerous intersection, to thereby enable the vehicles to proceed at a more cautious speed. On dangerous curves arrangements of embedded highly directive radiating elements may be used for successively applying vehicle brakes as the vehicles attempt to negotiate such curves at too high a speed. Thus traffic at dangerous locations can be automatically slowed to insure flow of traffic at safe speeds.

While I have described various circuits as applied to particular kinds of mobile bodies, I desire it to be understood that the circuits illustrated are interchangeable and useable on any type of mobile bodies. While I have illustrated one form of centrifugal control mechanism I realize that various constructions of centrifugal control means may be employed and I do not intend my invention to be restricted to the particular form illustrated herein.

The possible frequencies which may be best employed in the protective radio frequency beam transmitted from the preceding mobile body to the approaching mobile body may be so removed in the frequency spectrum from the frequencies employed in propagating the radio frequency beam from the approaching mobile body to the preceding mobile body for reception on the approaching mobile body that there is no mutual interference between the two systems. My invention contemplates standardization of this system for all vehicles so that mutual coaction of moving vehicles is assured on highways and collisions prevented. The low speed at which vehicles normally operate in congested traffic will generally maintain the system inactivated but in any event the circuits are readily switched off when not desired for protective use, by opening the switches provided for that purpose. When an automatic application of the control or brake occurs this is maintained so long as the radio control force persists. The brake control system is so set that there is no sudden grabbing of the brake drums but a gradual application that will not introduce hazards or accidents. The warning thus given enables the operator to immediately take over for manual control and operation.

The principles of my invention are also applicable to aircraft for preventing head-on collisions between planes or by a plane with another object by automatic control of the elevating planes or rudder for avoiding head-on collisions.

While I have described my invention in certain of its preferred embodiments I realize that various modifications may be made and I intend no limitations upon my invention other than may be imposed by the scope of the appended claims.

What I claim and desire to secure by Letters Patent of the United States, is as follows:

1. A protective system for mobile bodies comprising electromagnetic wave transmission means carried by a mobile body and operative to propagate a beam of high frequency electromagnetic energy in the direction of travel of the mobile body, control means carried by the mobile body, electromagnetic wave receiving apparatus on said mobile body, means on said mobile body and activated by said electromagnetic wave receiving apparatus for operating said control means, and, separate means carried by said mobile body and driven in proportion to the speed of movement of the mobile body to control either of two conditions, one condition producing a complete cessation of the operation of the control means carried by said mobile body and the other condition producing a change in the amplitude of the propagated electromagnetic wave energy between maximum and minimum limits for activating said electromagnetic wave receiving apparatus by energy reflected by an obstruction in the path of the propagated beam of high frequency electromagnetic energy emitted by said electromagnetic wave transmission means.

2. A protective system for mobile bodies comprising electromagnetic wave transmission means carried by a mobile body and operative to propagate a beam of electromagnetic wave energy in the direction of travel of the mobile body, control means carried by the mobile body, electromagnetic wave receiving apparatus on said mobile body, means on said mobile body and activated by said electromagnetic wave receiving apparatus for operating said control means, means controlled by the movement of the mobile body above predetermined speed for activating said electromagnetic wave receiving apparatus by electromagnetic wave energy reflected by an obstruction in the path of the propagated beam of electromagnetic wave energy emitted by said electromagnetic wave transmission means said last mentioned means operating to deactivate said electromagnetic wave radio receiving apparatus when the mobile body travels at less than said predetermined speed, and means for controlling the amplitude of transmission of the beam of electromagnetic wave energy from said electromagnetic wave transmission means in proportion with the speed of the mobile body.

3. A protective system for mobile bodies comprising a electromagnetic wave transmitter carried by a mobile body for propagating a beam of electromagnetic wave energy in the direction of travel of the mobile body, means for controlling the amplitude of transmission of the beam of electromagnetic wave energy in accordance with the speed of movement of the mobile body, control means on the mobile body, two independent circuit controlling devices connected in series with said control means, one of said devices being operated when the speed of said mobile body exceeds a predetermined limit and electromagnetic wave receiving apparatus operating the other of said circuit controlling devices when excited by electromagnetic wave energy reflected by an intervening object in the path of travel of the mobile body for conjointly operating said control means.

4. A collision preventing system for protecting mobile bodies, comprising in combination with a mobile body, an electromagnetic wave transmission means carried by the mobile body and operative to propagate a beam of electromagnetic wave energy in the direction of travel of the mobile body control means on the mobile body, means operative in proportion to the speed of movement of the mobile body for conditioning said control means preparatory for operation, separate means for controlling the amplitude of transmission of the beam of electromagnetic wave energy in proportion to the speed of movement of the mobile body, electromagnetic wave receiving apparatus for operating said control means, and means for exciting said electromagnetic wave receiving apparatus by the electromagnetic wave energy in said propagated beam reflected by an obstruction in the path of movement of said mobile body.

5. A collision preventing system for protecting mobile bodies, comprising in combination with a mobile body, electromagnetic wave transmission means carried by the mobile body and operative to propagate a beam of electromagnetic wave energy in the direction of travel of the mobile body, means operative in proportion to conditions of barometric pressure for controlling the amplitude of transmission of the beam of electromagnetic wave energy, control means on the mobile body, electromagnetic wave receiving apparatus for operating the control means, and means for activating said electromagnetic wave receiving apparatus by the electromagnetic wave energy in said propagated beam reflected by an obstruction in the path of movement of said mobile body.

6. A collision preventing system for protecting mobile bodies, comprising in combination with a mobile body, an electromagnetic wave transmission means carried by the mobile body and operative to propagate a beam of electromagnetic wave energy in the direction of travel of the mobile body, means operative in proportion to the condition of barometric pressure and the speed of movement of the mobile body for controlling the amplitude of transmission of the beam of electromagnetic wave energy in proportion of the barometric pressure and the speed of movement of the mobile body, control means on the mobile body, electromagnetic wave receiving apparatus for operating said control means, and means for activating said electromagnetic wave receiving apparatus by the energy in said propagated beam of electromagnetic wave energy reflected by an obstruction in the path of movement of the mobile body.

7. A collision preventing sytem for protecting mobile bodies, comprising in combination with a mobile body, electromagnetic wave transmission means carried by the mobile body and operative to propagate a beam of electromagnetic wave energy in the direction of travel of the mobile body, means operative in proportion to the speed of movement of the mobile body for controlling the amplitude of the energy emitted by said electromagnetic wave transmission means, control means on the mobile body, electromagnetic wave receiving apparatus for operating said control means, means for automatically deactivating said control means while said mobile body operates below a predetermined speed, said last mentioned means operating to activate said control means when said mobile body operates above a predetermined speed, and means for exciting said electromagnetic wave receiving apparatus by the electromagnetic wave energy in said propagated beam reflected by an obstruction in the path of movement of said mobile body.

8. A collision preventing system for protecting mobile bodies, comprising in combination with a mobile body, electromagnetic wave transmission means carried by the mobile body and operative to propagate a beam of electromagnetic wave energy in the direction of travel of the mobile body, means operative in proportion to the speed of movement of the mobile body for controlling the amplitude of the beam of electromagnetic wave energy emitted by said electromagnetic wave transmission means, control means on the mobile body, electromagnetic wave receiving apparatus, an electromagnetic relay controlled by said electromagnetic wave receiving apparatus, a pair of contactors connected in series circuit arrangement with a source of potential and the control means on the mobile body, one contactor of said pair of contactors being operated by the electromagnetic relay connected with said electromagnetic wave receiving apparatus, and a separate electromagnetic relay associated with the other contactor of said pair of contactors and controlled by said means operative in proportion to the speed of movement of the mobile body whereby said last-mentioned contactor is closed when said mobile body moves at a rate above a predetermined speed for conditioning said control means, said electromagnetic wave receiving apparatus being excited by the energy in said propagated beam reflected by an obstruction in the path of movement of said mobile body.

9. In a radar collision prevention system for mobile bodies, the combination of a mobile body having electromagnetic wave transmitter thereon for emitting a beam of electromagnetic wave energy in the direction of the path of travel of the mobile body, control means on the mobile body, electromagnetic wave receiving apparatus for operating said control means, means for activating said electromagnetic wave receiving apparatus by the energy in said emitted beam of electromagnetic wave energy which is reflected by an obstruction in the path of movement of the mobile body, means controlled by the speed of movement of the mobile body for predetermining the time of operation of said control means and separate means responsive to the speed of movement of the mobile body for controlling the amplitude of the beam of propagated electromagnetic wave energy in proportion to the said speed of movement of the mobile body.

10. A collision preventing system for protecting mobile bodies, comprising in combination with a mobile body, an electromagnetic wave transmission means carried by the mobile body and operative to propagate a beam of electromagnetic wave energy in the direction of travel of the mobile body, a centrifugally controlled mechanism on said mobile body operative to control two electric conditions of of which is determined by a make or break contactor and the other of which is determined by a progressively operated variable resistor, said electromagnetic wave transmission means being controlled as to amplitude of transmission by said progressively operated variable resistor, control means on the mobile body, electromagnetic wave receiving apparatus for operating said control means, electrical connections from said control means to said make or break contactor for breaking the circuit to said control means while the centrifugally controlled mechanism operates in a position in which said variable resistance is controlled at substantially maximum value for automatically deactivating said control means, said electromagnetic wave receiving apparatus being subjected to activation by electromagnetic wave energy in the transmitted beam reflected by an obstruction in the path of movement of the mobile body.

References Cited in the file of this patent

UNITED STATES PATENTS

| Number | Name | Date |
|---|---|---|
| 1,677,816 | Daya | July 17, 1928 |
| 2,028,497 | Clausing | Jan. 21, 1936 |
| 2,034,616 | Gossler | Mar. 17, 1936 |
| 2,128,067 | Alimaras | Aug. 23, 1938 |
| 2,131,042 | Halstead | Sept. 27, 1938 |
| 2,176,469 | Moueix | Oct. 17, 1939 |
| 2,187,648 | Franklin | Jan. 16, 1940 |
| 2,188,293 | Williams | Jan. 23, 1940 |
| 2,216,575 | Seinfeld | Oct. 1, 1940 |
| 2,254,218 | Halstead | Sept. 2, 1941 |
| 2,420,016 | Sanders | May 6, 1947 |
| 2,424,193 | Rost | July 15, 1947 |
| 2,530,418 | Alvarez | Nov. 21, 1950 |